(12) United States Patent
Merz et al.

(10) Patent No.: US 7,270,460 B2
(45) Date of Patent: Sep. 18, 2007

(54) VEHICLE LIGHT

(75) Inventors: Bernd Merz, Kohlberg (DE); Volker Sandtrock, Kusterdingen (DE)

(73) Assignee: Sidler GmbH & Co. KG, Tubingen (DE)

( * ) Notice: Subject to any disclaimer, the term of this patent is extended or adjusted under 35 U.S.C. 154(b) by 25 days.

(21) Appl. No.: 11/257,920

(22) Filed: Oct. 25, 2005

(65) Prior Publication Data

US 2006/0092654 A1 May 4, 2006

(30) Foreign Application Priority Data

Oct. 28, 2004 (DE) ............ 10 2004 052 348

(51) Int. Cl.
*A41F 1/00* (2006.01)
(52) U.S. Cl. .................... 362/581; 362/503
(58) Field of Classification Search ......... 362/555, 362/580, 581, 503
See application file for complete search history.

(56) References Cited

U.S. PATENT DOCUMENTS

| | | | | |
|---|---|---|---|---|
| 5,305,190 A | * | 4/1994 | Clement | 362/503 |
| 5,400,225 A | * | 3/1995 | Currie | 362/554 |
| 5,771,155 A | * | 6/1998 | Cook | 361/710 |
| 5,974,065 A | * | 10/1999 | Kanda | 372/50.23 |
| 6,621,714 B1 | * | 9/2003 | Li et al. | 361/801 |
| 7,137,723 B2 | * | 11/2006 | Hwan | 362/503 |
| 2007/0084008 A1 | * | 4/2007 | Hwa | 15/250.201 |

FOREIGN PATENT DOCUMENTS

DE 198 03 537 A1 8/1999

* cited by examiner

*Primary Examiner*—Thomas M. Sember
*Assistant Examiner*—Julie A. Shallenberger
(74) *Attorney, Agent, or Firm*—Walter A. Hackler

(57) ABSTRACT

In a brake light (1) comprising at least one rod-shaped optical fiber (9) and at least one light source, wherein the light from the light source is coupled into the optical fiber (9) at its end face and is decoupled from the optical fiber (9) via a peripheral exit surface (11), in accordance with the invention, two rod-shaped optical fibers (9) are disposed one after another in the longitudinal direction of the brake light (1), wherein the at least one light source is disposed between the two optical fibers (9).

11 Claims, 2 Drawing Sheets

VEHICLE LIGHT

This application claims priority under 35 U.S.C. §119(a) to German Patent Application No. 10 2004 052 348.7, filed Oct. 28, 2004, the entire contents of which are hereby incorporated by reference.

BACKGROUND OF THE INVENTION

The present invention relates to a vehicle light, in particular, a brake light, comprising at least one rod-shaped optical fiber and at least one light source, wherein the light from the light source is coupled into the optical fiber at the end face thereof, and is decoupled from the optical fiber via a peripheral exit surface.

In a conventional brake light of this type, a light source in the form of an LED is disposed in front of each of the two end faces of the optical fiber. On its periphery, the optical fiber comprises a light exit surface and, opposite thereto, a toothed surface for deflecting the light, coupled into the optical fiber at both end faces thereof, in the direction of the light exit surface. The number and geometry of the teeth are optimized, but nevertheless, the luminosity of long brake lights decreases towards the center due to the light coupled in from the end face, which is disturbing for the viewer. Moreover, an optical fiber length of e.g. 50 cm requires separate electric supply lines for both light sources.

In contrast thereto, it is the object of the present invention to further improve a brake light of the above-mentioned type.

SUMMARY OF THE INVENTION

This object is achieved in accordance with the invention in that two rod-shaped optical fibers are disposed one after another in the longitudinal direction of the vehicle light and the at least one light source is disposed between the two optical fibers.

This inventive brake light is advantageous in that it is easier for the human eye to accept luminosity reduction from the center outwards than vice versa. Although each optical fiber is associated with at least one light source, only one central electric supply line is required in accordance with the invention.

For cooling a printed circuit board which may also comprise the series resistor in case of an LED, one single cooling body may be provided which is in thermal contact with one or each printed circuit board of the single light source or several light sources. In particularly preferred embodiments of the invention, each rod-shaped optical fiber is associated with a cooling body which is in thermal contact with a printed board which carries at least one light source, in particular, all light sources of one optical fiber.

The two printed circuit boards are preferably clamped to the one or a respective cooling body. Towards this end, spring clips may advantageously be provided which clamp the printed circuit boards to the respective cooling body, at the same time centering the optical fiber relative to the printed circuit board. The spring clip may e.g. have a hole for the optical fiber through which the optical fiber is positioned exactly in front of the light source when the spring clip is clamped.

The two printed circuit boards are advantageously connected to each other in an electrically conducting manner via wires such that only one of the two printed boards must be connected to electric supply lines.

In a particularly preferred manner, the one or each cooling body is disposed in a convection channel of a self-contained convection channel line which is vertically disposed in the assembled state of the brake light. The air heated on the heating body is cooled in the convection line before being returned to the cooling body. The self-contained convection channel line permits, in particular, water-proof construction of the brake light.

To minimize the distance and thereby the dark zone between the two optical fibers, the cooling ribs of the cooling body/bodies are disposed outside of the room between the two optical fibers.

The brake light housing advantageously comprises an opening for the spray nozzle of the rear window washer system in the dark zone between the two optical fibers.

Further advantages of the invention can be extracted from the description and the drawing. The features mentioned above and below may be used individually or collectively in arbitrary combination. The embodiment shown and described is not to be understood as exhaustive enumeration but has exemplary character for describing the invention.

BRIEF DESCRIPTION OF THE INVENTION

DESCRIPTION OF THE PREFERRED EMBODIMENT

Figure 1:
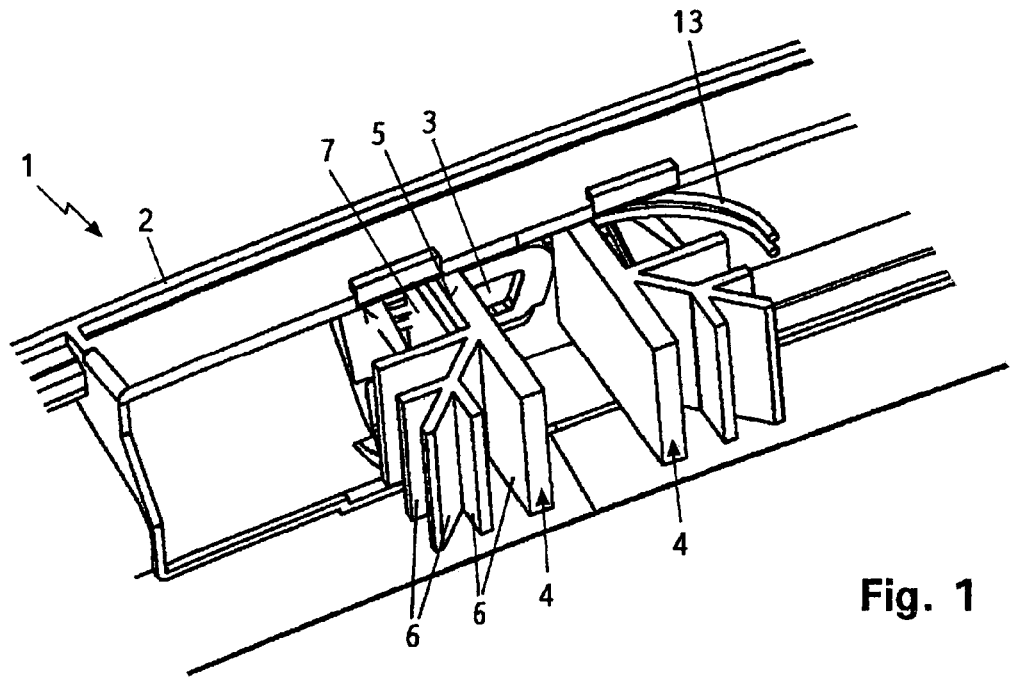
FIG. 1 shows the inventive brake light without longitudinal ends and with removed rear housing half.

The brake light 1 of FIG. 1 is a so-called raised brake light which is disposed centrally at the rear or rear window of a vehicle as third brake light.

Figure 2:
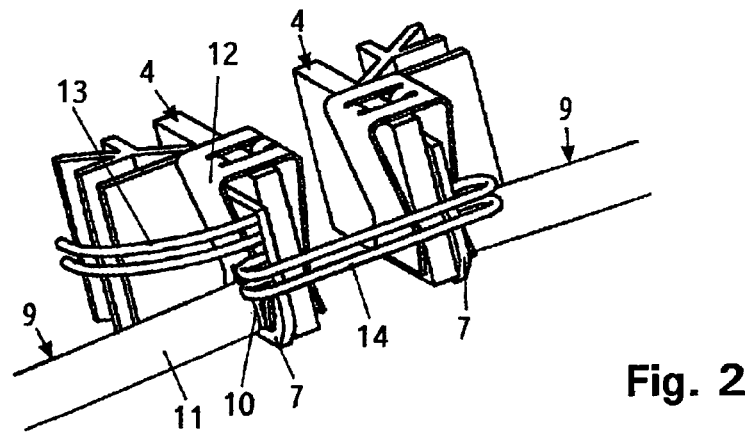
FIG. 2 shows the essential parts of the inventive brake light without brake light housing.

The brake light 1 comprises a longitudinal light housing with a front housing half 2 and a rear housing half (not shown). The front housing half 2 has a central opening 3 at its front side into which a spray nozzle of the rear window washer system is inserted. One cooling body 4 is inserted into the front housing half 2 on each side of the opening 3, which comprises a lateral contact surface 5 and cooling ribs 6 extending to the rear and the side. A printed circuit board 7 abuts in a planar manner on the contact surface 5, such that the printed circuit board 7 is in thermal contact with the cooling body 4, the printed circuit board 7 carrying a light source 8 (FIG. 3) designed as LED. One rod-shaped optical fiber 9 is disposed in front of each of the two light sources 8 of the brake light 1, which extends in the longitudinal direction of the brake light 1. The light of the light source 8 is coupled into the respective optical fiber 9 via its end face 10 and is decoupled from the optical fiber 9 via a front-side exit surface 11 (FIG. 2). With other words, the two optical fibers 9 are disposed one after another in the longitudinal direction of the brake light 1 with their end faces 10 facing each other, in such a manner that the two light sources 8 are disposed between the two optical fibers 9.

Figure 3:
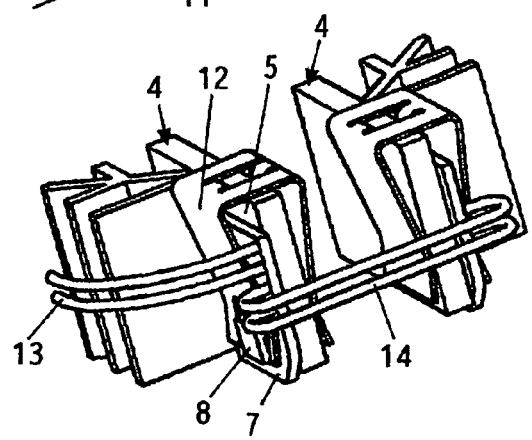
FIG. 3 shows a view of some of the essential parts of the brake light of FIG. 2.

Each printed circuit board 7 is clamped to the cooling body 4 via a spring clip 12 which surrounds the printed circuit board 7 and its cooling body 4. The left-hand printed circuit board 7 of FIGS. 2 and 3 is connected to electric supply lines 13, whereas the right-hand printed board 7 is connected to the left-hand printed circuit board 7 via lines 14.

Figure 4:
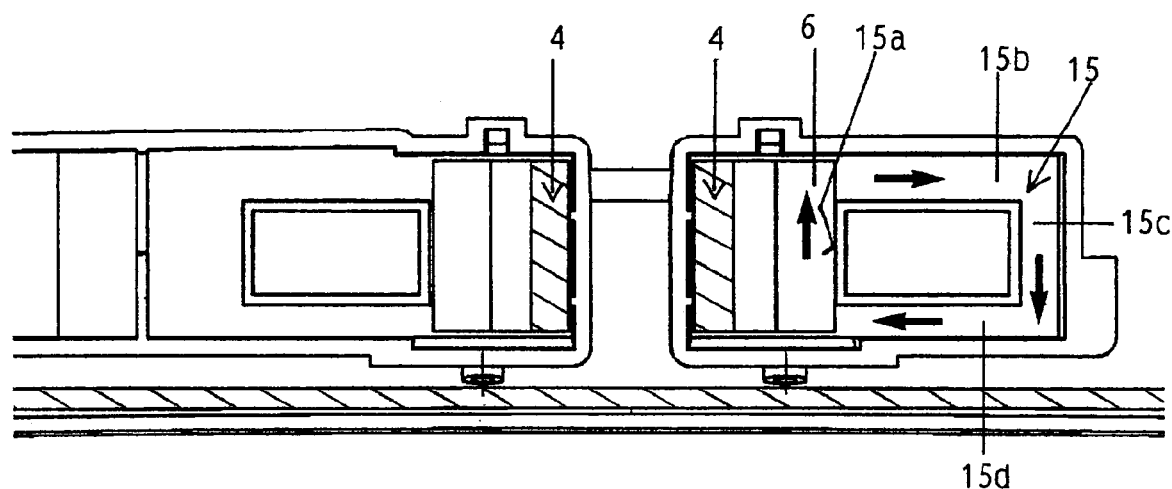
FIG. 4 shows a longitudinal section through a self-contained convection channel line of the inventive brake light.

As is shown in FIG. 4, the cooling ribs 6 of each cooling body 4 delimit a convection channel 15a, which is vertically arranged in the assembled position of the brake light 1, of a self-contained convection channel line 15. The air heated on the cooling ribs 6 rises in the vertical convection channel 15a, flows through an upper horizontal convection channel 15b, is cooled in a vertical convection channel 15c and is returned to the vertical convection channel 15a via a lower horizontal convection channel 15d. In FIG. 4, this convection circuit is indicated by arrows.

We claim:

1. Vehicle brake light comprising:
   a pair of spaced apart rod shaped optical fibers axially aligned with one another, each fiber having an end face and an exit surface;
   at least one light source disposed between the fibers for coupling light into the fiber end faces, said light decoupling from the fibers via the exit surfaces, said at least one light source including a printed circuit board;
   a cooling body disposed in thermal contact with the circuit board; and
   clamp means for disposing the cooling body between two printed circuit boards.

2. Vehicle light according to claim 1 wherein each optical fiber is associated with at least one light source.

3. Vehicle light according to claim 1 wherein said cooling means includes a spring clip.

4. Vehicle light according to claim 1, wherein each rod-shaped optical fiber is associated with a cooling body in thermal contact with a printed circuit board carrying at least one light source.

5. Vehicle light according to claim 4, wherein two printed circuit boards are clamped to a respective cooling body.

6. Vehicle light according to claim 5, wherein each printed circuit board is clamped to the cooling body by a spring clip encompassing the printed circuit board and the respective cooling body.

7. Vehicle light according to claim 1, wherein the spring clip centers the optical fiber and the printed circuit board relative to each other.

8. Vehicle light according to claim 1, wherein two printed circuit boards are connected to each other in an electrically conducting manner via wires, and only one of the two printed circuit boards is connected to electric supply lines.

9. Vehicle light according to claim 1, wherein the cooling body is disposed in a self-contained convection channel.

10. Vehicle light according to claim 1, wherein cooling ribs of the cooling body are provided outside of the space between the optical fibers.

11. Vehicle brake light comprising:
    a pair of spaced apart rod shaped optical fibers axially aligned with one another, each fiber having an end face and an exit surface;
    at least one light source disposed between the fibers for coupling light into the fiber end faces, said light decoupling from the fibers via the exit surfaces; and
    a brake light housing having an opening between the two rod-shaped optical fibers for a rear window spray washer nozzle.

* * * * *